United States Patent
Vasilyev et al.

(10) Patent No.: US 9,261,624 B2
(45) Date of Patent: Feb. 16, 2016

(54) THERMAL AND EPITHERMAL NEUTRONS FROM AN EARTH FORMATION

(71) Applicant: Baker Hughes Incorporated, Houston, TX (US)

(72) Inventors: Maxim Vasilyev, The Woodlands, TX (US); Toyli Anniyev, The Woodlands, TX (US); Steven M. Bliven, Magnolia, TX (US); Andrey Federov, Minsk (BY); Mikhail Korjik, Minsk (BY)

(73) Assignee: BAKER HUGHES INCORPORATED, Houston, TX (US)

( * ) Notice: Subject to any disclaimer, the term of this patent is extended or adjusted under 35 U.S.C. 154(b) by 123 days.

(21) Appl. No.: 13/918,200

(22) Filed: Jun. 14, 2013

(65) Prior Publication Data

US 2014/0367562 A1  Dec. 18, 2014

(51) Int. Cl.
*G01V 5/10* (2006.01)
*G01V 5/08* (2006.01)

(52) U.S. Cl.
CPC . *G01V 5/107* (2013.01); *G01V 5/08* (2013.01)

(58) Field of Classification Search
CPC ................................. G01V 5/08; G01V 5/107
USPC ........................................ 250/269.4, 518.1
See application file for complete search history.

(56) References Cited

U.S. PATENT DOCUMENTS 3,382,363 A * 5/1968 Gant, Jr. et al. .......... 250/363.01
3,707,631 A * 12/1972 Untermyer ............... 250/363.01
4,808,838 A 2/1989 Gold (Continued)

FOREIGN PATENT DOCUMENTS

GB   2482024 A * 1/2012
WO   2012170619 A2  12/2012

OTHER PUBLICATIONS

Nikitin, Anton et al., "Novel glass ceramic scintillator for detection of slow neutrons in well logging applications," Nuclear Science, IEE Transactions on V. 60 Issue 2, pp. 1044-1048 (Apr. 2013). See: http://ieeexplore.ieee.org/xpl/login.jsp?tp=&arnumber=6496310 &url=http%3A%2F%2Fieeexplore.ieee.org%  2Fxpls%2Fabs_all. jsp%3Farnumber%3D6496310.

(Continued)

*Primary Examiner* — David Porta
*Assistant Examiner* — Mindy Vu
(74) *Attorney, Agent, or Firm* — Mossman Kumar & Tyler PC

(57) ABSTRACT

An apparatus and method for detecting radiation in a borehole intersecting an earth formation. The apparatus may include a neutron sensitive scintillation media and at least one optically transparent neutron absorptive material optically coupled to the media, which may be positioned to prevent incident neutrons from reaching a neutron-shaded surface of the media, and to provide directional sensitivity. The neutron absorptive material may comprise a light guide optically coupled to the neutron sensitive scintillation media. The scintillation media may be disposed within the at least one optically transparent neutron absorptive material, which may be configured to prevent substantially all incident neutrons having an incident neutron energy below a selected energy threshold from reaching the media. The selected energy threshold may be approximately 0.2 eV. A neutron-reflecting material may be disposed within the scintillation media. The neutron-reflecting material may comprise a light guide optically coupled to the neutron sensitive scintillation media.

20 Claims, 12 Drawing Sheets

(56) References Cited

U.S. PATENT DOCUMENTS

| | | |
|---|---|---|
| 8,080,781 B2 | 12/2011 | Zhang et al. |
| 8,299,420 B2 | 10/2012 | Stoller |
| 2008/0105821 A1 | 5/2008 | Radtke et al. |
| 2009/0140134 A1 | 6/2009 | Stoller et al. |
| 2010/0193675 A1 | 8/2010 | Stoller |
| 2011/0204243 A1* | 8/2011 | Bendahan et al. ............ 250/367 |
| 2012/0312994 A1* | 12/2012 | Nikitin et al. ................ 250/362 |
| 2013/0075600 A1 | 3/2013 | Nikitin et al. |

OTHER PUBLICATIONS

Experimental Techniques of Neutron Studies. Moscow Energoatomizdat, 1990, in Russian.

Int'l Search Report & Written Opinion in PCT/US2014/041195, dtd Oct. 8, 2014.

\* cited by examiner

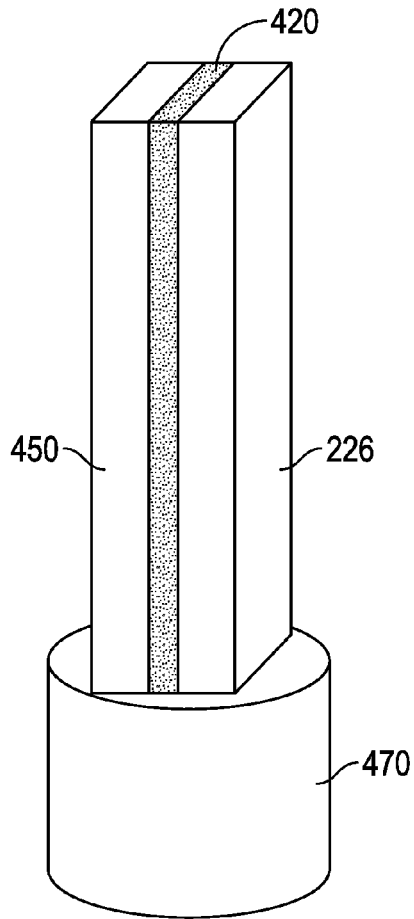 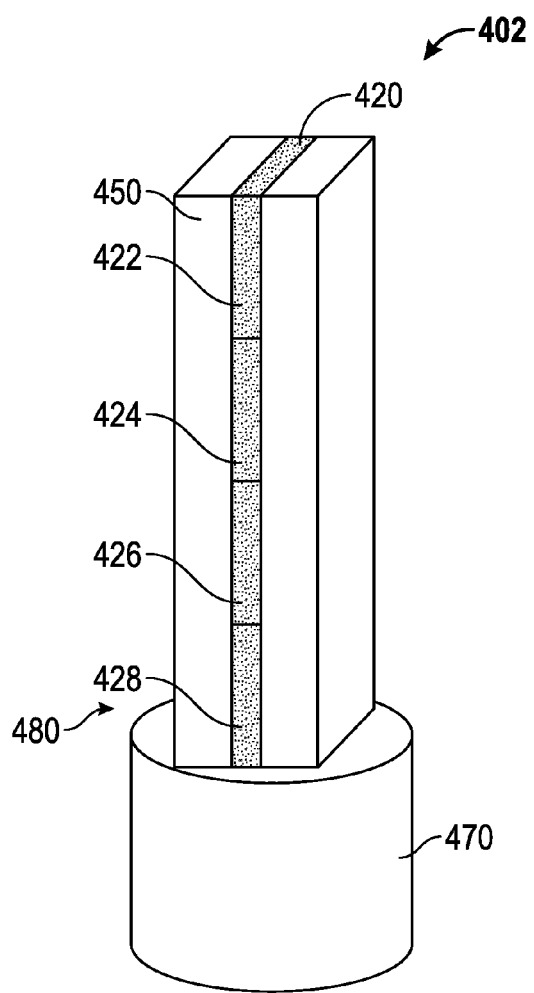
FIG. 4B  FIG. 4C

THERMAL AND EPITHERMAL NEUTRONS FROM AN EARTH FORMATION

FIELD OF THE DISCLOSURE

In one aspect, this disclosure generally relates to borehole logging methods and apparatuses for estimating formation properties using nuclear radiation based measurements.

BACKGROUND OF THE DISCLOSURE

Oil well logging has been known for many years and provides an oil and gas well driller with information about the particular earth formation being drilled. In conventional oil well logging, during well drilling and/or after a well has been drilled, a radiation source and associated radiation detectors may be conveyed into the borehole and used to determine one or more parameters of interest of the formation. A rigid or non-rigid carrier is often used to convey the radiation source, often as part of a tool or set of tools, and the carrier may also provide communication channels for sending information up to the surface. The present disclosure is directed to enhancing the manufacture, use, and effectiveness of such devices.

SUMMARY OF THE DISCLOSURE

In aspects, the present disclosure is related to methods of estimating a parameter of interest of a formation using radiation detected from a subterranean formation.

One general embodiment according to the present disclosure may be a formation evaluation tool for detecting radiation in a borehole in a volume of an earth formation. The tool may include a neutron sensitive scintillation media and at least one optically transparent neutron absorptive material optically coupled to the media, which may make up an active elements of a radiation detector. The optically transparent neutron absorptive material may comprise an optically transparent light guide optically coupled to the neutron sensitive scintillation media. The at least one optically transparent neutron absorptive material may be positioned to prevent incident neutrons from reaching a neutron-shaded surface of the media. The at least one optically transparent neutron absorptive material may be positioned to provide directional sensitivity by allowing a lower proportion of neutrons to reach the media through the neutron-shaded surface than through the remaining surfaces. In further embodiments, the neutron sensitive scintillation media may be disposed within the at least one optically transparent neutron absorptive material, and the at least one optically transparent neutron absorptive material may be configured to prevent substantially all incident neutrons having an incident neutron energy below a selected energy threshold from reaching the media. The selected energy threshold may be approximately 0.2 eV. A neutron-reflecting material may be disposed within the scintillation media. The neutron-reflecting material may comprise an optically transparent light guide optically coupled to the neutron sensitive scintillation media.

The neutron-reflecting material may comprise at least one material selected from: i) a beryllium-based ceramic, ii) a carbon-based plastic, iii) a hydrogen-based plastic, iv) a deuterium-based plastic, ii) a carbon-based resin, iii) a hydrogen-based resin, iv) a deuterium-based resin. The at least one optically transparent neutron absorptive material may include at least one of i) Li-6 and ii) B-10.

The tool includes a photodetector configured to produce an output in response to light scintillations from the media. The tool may include a drill string; a radiation source positioned on the drill string; and a radiation detector positioned on the drill string wherein the active elements is associated with the radiation detector.

The at least one optically transparent neutron absorptive material may have a lower index of refraction than the media. The at least one optically transparent neutron absorptive material may absorb less than 5 percent of scintillation photons emitted by the media. The at least one optically transparent neutron absorptive material may include at least one material selected from: i) glass, ii) glass ceramics, iii) plastic, iv) organic crystal, v) inorganic crystal, and vi) ceramic material.

The at least one optically transparent neutron absorptive material may include atoms of at least one chemical element having a thermal neutron capture cross section higher than a corresponding fast neutron capture cross section. The at least one optically transparent neutron absorptive material may have a neutron attenuation coefficient of at least 0.5 cm-1, or may have a neutron attenuation coefficient of 1.0 cm-1, 1.5 cm-1, 2.0 cm-1, 3.0 cm-1, 4.0 cm-1, 5.0 cm-1, 6.0 cm-1, or higher for thermal neutrons. The length (l) may be 2.0 cm, 1.5 cm, 1.0 cm, 0.5 cm or less.

Another general embodiment according to the present disclosure may be a method for detecting radiation in a borehole in a volume of an earth formation. The method may include using a neutron sensitive scintillation media to produce light scintillations indicative of neutrons absorbed by the media; and transmitting at least a portion of the light scintillations through at least one optically transparent neutron absorptive material optically coupled to the media. The method may also include positioning the at least one optically transparent neutron absorptive material to prevent incident neutrons from reaching a neutron-shaded surface of the media.

The neutron sensitive scintillation media may be disposed within the at least one optically transparent neutron absorptive material, and the method may include selecting dimensions of the at least one optically transparent neutron absorptive material such that substantially all incident neutrons having an incident neutron energy below a selected energy threshold are prevented from reaching the media.

Another embodiment according to the present disclosure may be a method for estimating a parameter of interest, such as, for example, porosity, using a model relating incident neutron information from one or more detectors of the present disclosure to reference information or to one another.

Another embodiment according to the present disclosure may be an apparatus for estimating a parameter of an earth formation, comprising: a processor; a subsystem non-transitory computer-readable medium; and a program stored by the non-transitory computer-readable medium comprising instructions that, when executed, cause the processor to: estimate a parameter of interest, such as, for example, porosity, using a model relating incident neutron information from one or more detectors of the present disclosure to reference information or to one another.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 4A-4C illustrate tools including detectors in accordance with embodiments of the invention.

DETAILED DESCRIPTION

In aspects, this disclosure relates to detecting thermal and epithermal neutrons returning from a subterranean formation. In other aspects, this disclosure relates to estimating a parameter of interest, such as, for example, porosity of a subterranean formation, from detected neutrons. Illustrative methods for estimating parameters of interest may include the acquiring and utilization of information characterizing detected neutrons as thermal or epithermal neutrons. In many instances, the information used for these estimations may be acquired by tools deployed into a wellbore intersecting one or more formations of interest. For context, an exemplary system for deploying and using such tools to acquire this information is described below. Each of these aspects may be referred to generally as investigation of the formation.

The formation may be exposed to energy from a radiation source. Downhole tools may include this radiation source and one or more detectors in one or more detector chambers. Herein, the radiation source may include, but is not limited to, one or more of a neutron source, a gamma-ray source, and an x-ray source. The detectors may be used to detect radiation from the formation, though the detectors are not limited to detecting radiation of the same type as emitted by the radiation source. Detectors may include scintillation media, which may be defined as media in which energy of ionizing radiation is converted to energy of light photons (e.g., scintillation photons). To increase sensitivity, a neutron detector may be decentralized in the borehole hole so as to be as close as possible to the borehole wall and to the formation.

In addition to a "useful" spectrum of neutrons scattered in the earth formation, using neutron generators for well logging typically results in the formation of a spectrum of neutrons originating from neutrons scattered on construction elements of the borehole. In this "parasitic" spectrum, thermal and epithermal neutrons dominate. Distinguishing these neutrons from thermal and epithermal neutrons from the formation using conventional neutron detectors (e.g., based on He-3 counters as well as Li-6 and B-10 glass and composites) is problematic. Thus, the "useful" spectrum from the formation is distorted, causing errors in the estimation of hydrocarbons in the formation. It is therefore desirable to minimize detected neutrons from the borehole.

Traditionally, detectors may have shielding to prevent the counting of radiation from unintended sources. Shielding material may be defined as materials blocking transmission of neutrons without re-emitting such that the absorbed radiation is quantifiable, and may include barium, cadmium, and so on. The shielding may protect the scintillation media from neutrons coming from directions away from the formation, which are statistically more likely to originate in the borehole and equipment ('borehole neutrons'). Absorption screens and filters are widely used.

Figure 1:
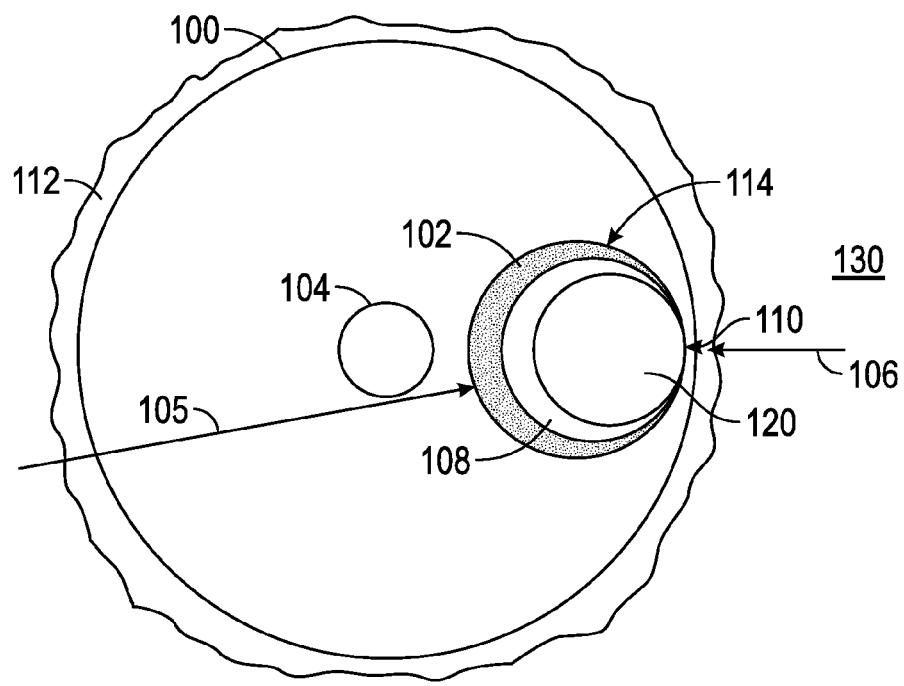
FIG. 1 illustrates a prior art tool for use in a borehole including a shielded neutron detector of the prior art.

FIG. 1 illustrates a prior art tool 100 for use in a borehole 112 including a shielded neutron detector 110 of the prior art. The shielded neutron detector 110 includes a scintillation media 120. The tool may include a mud channel 104 for circulating drilling mud. The conventional neutron detector 110 is protected from neutrons 105 arriving from unwanted directions with the neutron absorber 102. The space in the detector chamber 114 occupied by neutron absorber 102 reduces useful detector volume. Neutron reflector 108 may be used to enhance the detection of neutrons 106 incident on the neutron detector 110 from the formation 130 by reflecting neutrons back into the neutron detector 110 for detection.

Figure 2A:
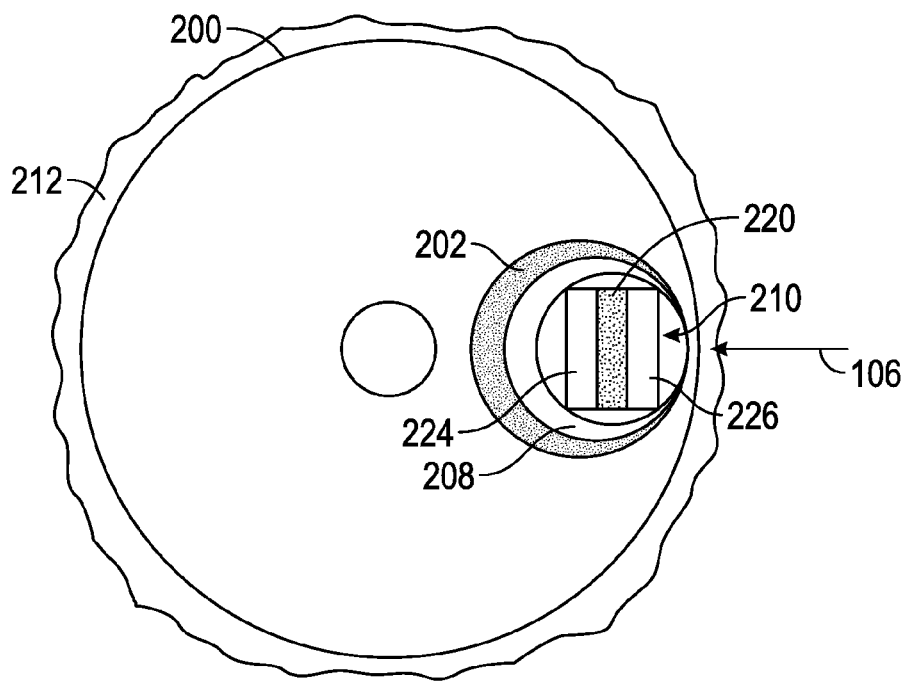
FIGS. 2A and 2B illustrate a tool for use in a borehole including a shielded neutron detector of the prior art.
Figure 2B:
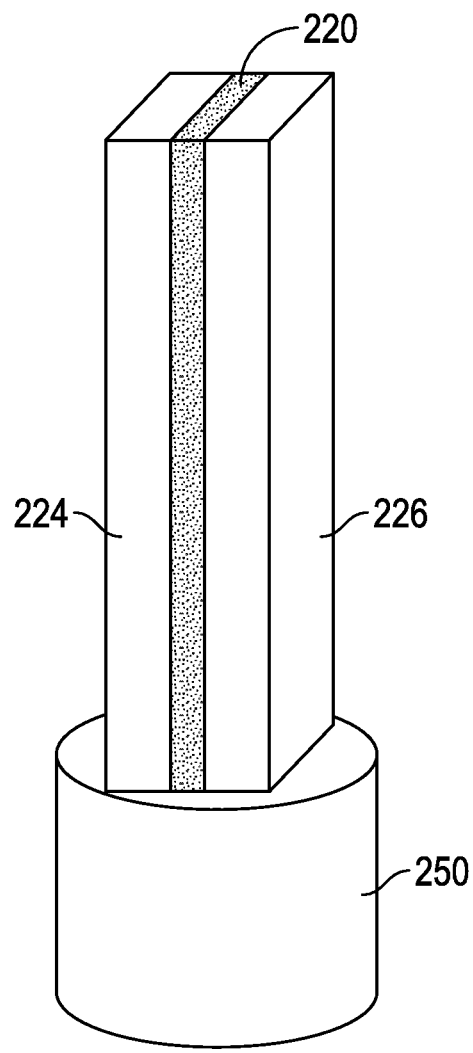

FIGS. 2A and 2B illustrate a tool 200 for use in a borehole 212 including a shielded neutron detector 210 of the prior art. The conventional neutron detector 210 includes neutron absorber 202 and neutron reflector 208. The shielded neutron detector 210 includes scintillation media 220 and optical light guides 224 and 226. Scintillation media 220 may comprise Li-6 enriched glass ceramics. The detector includes a sensitive volume. The "sensitive volume" is the detection volume, filled with scintillation media 220, which produces scintillation photons upon neutron absorption. The sensitive volume does not include accompanying detector materials such as light reflective wrapping, housing, light guides, and so on.

Optical light guides ('light guides') 224, 226 are typically made of quartz or other glass-like transparent material. A light guide is an optically transparent media, wherein light produced by the sensitive volume of the detector propagates toward the photodetector. The light guides provide delivery of scintillation photons to a photodetector 250, and may be implemented as plates coupled to the scintillation element using an adhesive with a refractive index close to that of the glass ceramics and the light guides.

Some materials which are efficient scintillation media (e.g., media providing large numbers of scintillation photons per unit of absorbed energy of incident radiation) may nonetheless suffer from self-absorption of scintillations. Self-absorption becomes more problematic as the dimensions of the scintillation media increase, because the photons must travel through more material. However, as discussed above, increased dimensions result in greater sensitivity for the detector. Thus, light guides have been employed to provide an optically transparent media, through which scintillations may reach the photodetector. The "active elements" of the detector may be defined as the sensitive volume optically coupled to one or more light guides, directly or indirectly.

Other prior art neutron detectors include a hollow cylinder on the base of Li-6 enriched Gs-20 glass with a light guide cylinder disposed therein. Li-6 enriched scintillation glass having a thickness of three to five millimeters may have a detection efficiency of thermal neutrons at approximately 90 percent. Higher degrees of sensitivity may be achieved by increasing the dimensions of the scintillation media (e.g., width and length). In all, the diameter of the photomultiplier is a limiting factor to detector sensitivity.

Thermal neutrons can be eliminated effectively using thin cadmium ('Cd') or gadolinium ('Gd') foils, but to eliminate epithermal neutrons thick shielding screens were required. Thick screens occupy considerable space proximate to the detector. The space requirements for thick screens affect design considerations for all tools measuring radiation downhole, but are particularly challenging in logging-while-drilling ('LWD') applications. It is desirable to position the detector as close to the formation as practicable. The short distance between detector and the mud channel (the main source of borehole thermal neutrons in LWD tools), together with the rigorous structural specifications commensurate with appropriate LWD tool body strength, restricts shielding to the volume inside the detector chamber. Placement of neutron shielding inside the detector chamber necessitates decreased neutron detector size, resulting in decreased count rates (e.g., lower sensitivity) and slower logging speeds.

Although prior art neutron detectors require additional neutron shielding to reduce neutrons incident on the detector from unwanted directions when used in a down-hole tool, reducing screen thickness in a down-hole tool would allow the use of a larger detector. For example, eliminating a 10 mm thick absorbing screen, allows the use of a photomultiplier tube with a sensitive area having an approximately 30 mm diameter instead of 20 mm diameter. A scintillation element with 50% greater width and length may have twice the sensitivity with the same light collection efficiency (i.e. the same signal-to-noise ratio).

General embodiments in accordance with the invention may include an apparatus for detecting thermal and epithermal neutrons using a neutron detector in accordance with embodiments of the present disclosure. Generally, detectors of the present disclosure include active elements, which includes a neutron sensitive scintillation media and at least one optically transparent neutron absorptive material optically coupled to the media. The at least one optically transparent neutron absorptive material may thus function as a light guide, while reducing or eliminating the need for further shielding.

The optically transparent neutron absorptive material may be any material capable of substantial neutron absorption. The material may include one or more of i) glass, ii) glass ceramics, iii) plastic, iv) organic crystal, v) inorganic crystal, vi) ceramic material, or any other appropriate material. The optically transparent neutron absorptive material may have a lower index of refraction than the scintillation media, and may have substantially no light absorption. The index of refraction may be lower than quartz. The neutron absorptive material may include atoms of at least one chemical element having a thermal neutron capture cross section higher than a corresponding fast neutron capture cross section. The neutron absorptive material may be doped with a thermal neutron capturing chemical element. More particularly, the material may include a glass or glass ceramic comprising at least one of i) Li-6 and ii) B-10, such as, for example, borosilicate glass with B-10 content.

In general, a neutron-absorbing light guide with a variety of neutron-absorbing atoms can be used. Among the variety of such atoms, the most suitable are light He-3, Li-6, and B-10. Three different nuclear reactions can be used to absorb thermal and epithermal neutrons. These are:

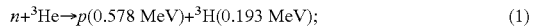

$n+^3\text{He} \rightarrow p(0.578 \text{ MeV})+^3\text{H}(0.193 \text{ MeV});$ (1)

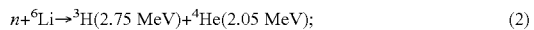

$n+^6\text{Li} \rightarrow ^3\text{H}(2.75 \text{ MeV})+^4\text{He}(2.05 \text{ MeV});$ (2)

$n+^{10}\text{B} \rightarrow ^7\text{Li}(1.0 \text{ MeV})+^4\text{He}(1.8 \text{ MeV});$

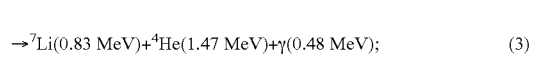

$\rightarrow ^7\text{Li}(0.83 \text{ MeV})+^4\text{He}(1.47 \text{ MeV})+\gamma(0.48 \text{ MeV});$ (3)

An effective use of the reaction (1) requires a high concentration of the He-3 isotope in the material, which is difficult to satisfy. The reaction (2), using absorption of neutrons by Li-6 isotopes, has the smallest cross section. Moreover, natural content of the Li-6 isotope is less than 7 percent, so additional enrichment of the lithium containing material is required to create effective absorber. Boron has some advantages to both species in absorbing thermal and epithermal neutrons. The neutron absorption cross section is as high as He-3. B-10 presence in the natural isotope mixture is approximately 20 percent; however, enrichment of natural boron with B-10 isotope in the neutron absorptive material will further improve efficiency of the light guide. Embodiments of the invention may include a natural isotope mixture or a mixture of isotopes enriched up to and including 100 percent. Moreover, boron can be used to obtain a variety of inorganic materials, including glass materials. Boron-silicate glasses have properties similar to quartz. Boron-silicate glasses lack temperature sensitivity and are not prone to breakdown. Further, light transmission characteristics of these glasses remain substantially constant throughout the range of temperatures typically found in the borehole.

Figure 5:
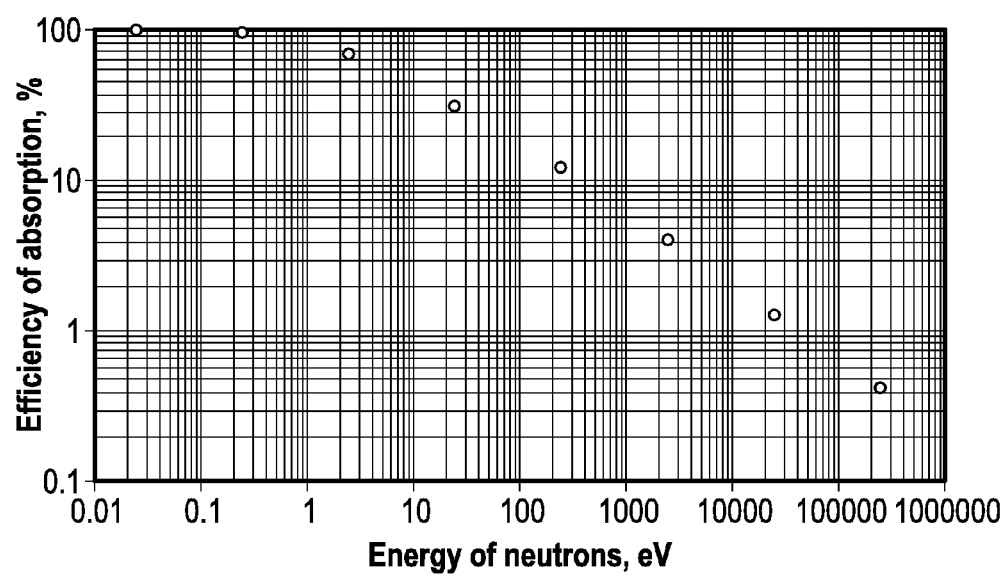
FIG. 5 shows neutron absorption efficiency in relation to energy of 10 mm thick boron-silicate glass with 10 percent natural boron content.

FIG. 5 shows neutron absorption efficiency in relation to energy of 10 mm thick boron-silicate glass with 10 percent natural boron content. Ten eV neutrons are absorbed with 50 percent efficiency in the neutron-absorbing light guide material. By using purely enriched B-10, the absorption efficiency may increase by a factor of five or more. Such strong suppression of epithermal neutrons, together with nearly 100 percent suppression of thermal neutrons from the borehole direction when using the borosilicate glass light guide in a neutron detector in the borehole, will effectively shade the scintillation media from borehole events without using additional neutron shielding material around the detector. Corrections to neutron counter readings due to environmental effects is significantly reduced in comparison with non-shielded detectors.

The at least one optically transparent neutron absorptive material may be positioned to prevent incident neutrons from reaching a neutron-shaded surface of the scintillation media. In some embodiments, the at least one optically transparent neutron absorptive material is positioned to provide directional sensitivity by allowing a lower proportion of neutrons to reach the media through the neutron-shaded surface than through the remaining surfaces. Thus, neutrons from directions adjacent to the neutron-shaded surface may be reduced in proportion to the remaining directions.

The neutron absorptive material may also be useful in other applications. Some measurements in down-hole logging such as porosity measurements with a single detector or die away logging require epithermal neutron detection. For example, an epithermal neutron detector based tool for die-away logging (porosity determination with one epithermal neutron detector through the measurement of reduction in epithermal neutron counts with time) with optimized external thermal neutron shielding is known in the art.

In general, porosity measurements with epithermal neutron detectors are less sensitive to such environmental conditions as salinity of water in borehole and formation lithology. Traditionally, epithermal detectors are created by placing an external neutron shielding moderator and thermal neutron shielding around a neutron detector. While being rather easy to implement, this technique has the same negative consequences with regards to space as the shielded detectors above. This is especially true in LWD tools, where no additional space for neutron moderator and shielding material is available in close proximity to the neutron detector. Thus the shielding is positioned around the detector inside LWD tool detector chamber, necessitating a reduction in the size of the scintillation element.

Novel epithermal neutron detectors are disclosed herein. Embodiments are disclosed wherein active elements of the detector (such as the light guides) play a role in thermal neutron moderation (e.g., shielding, reflection).

In one such construction, a neutron sensitive scintillation element with dimensions sufficient for effective epithermal neutron detection is surrounded by a relatively thin light guide comprising an optically transparent neutron absorptive material. As a result, substantially all thermal neutrons are captured in the light guide, and a detector with such construction becomes a detector of epithermal neutrons.

In another construction, a neutron sensitive scintillation element with dimensions sufficient for effective thermal neutron detection is surrounded by an optically transparent neutron absorptive material, and a neutron moderator is disposed within the neutron sensitive scintillation element to increase its sensitivity to epithermal neutrons after their thermalization. The neutron moderator may be based on carbon, beryllium, hydrogen or deuterium, and may also comprise an optically transparent media (e.g., C-H or C-D based plastic or resin). Thus, the neutron moderator may also function as an additional light guide for further improvement of the detector's scintillation detection.

Light guides according to the embodiments herein should not be considered external passive shielding, because the effective light collection from the scintillation media (e.g., Li-6 glasses or Li-6 glass ceramics) may be significantly higher when the neutron sensitive Li-6 glass scintillator is coupled with the light guide with properly selected parameters, such as refractive index and optical transparency in the scintillator emission region.

Figure 3:
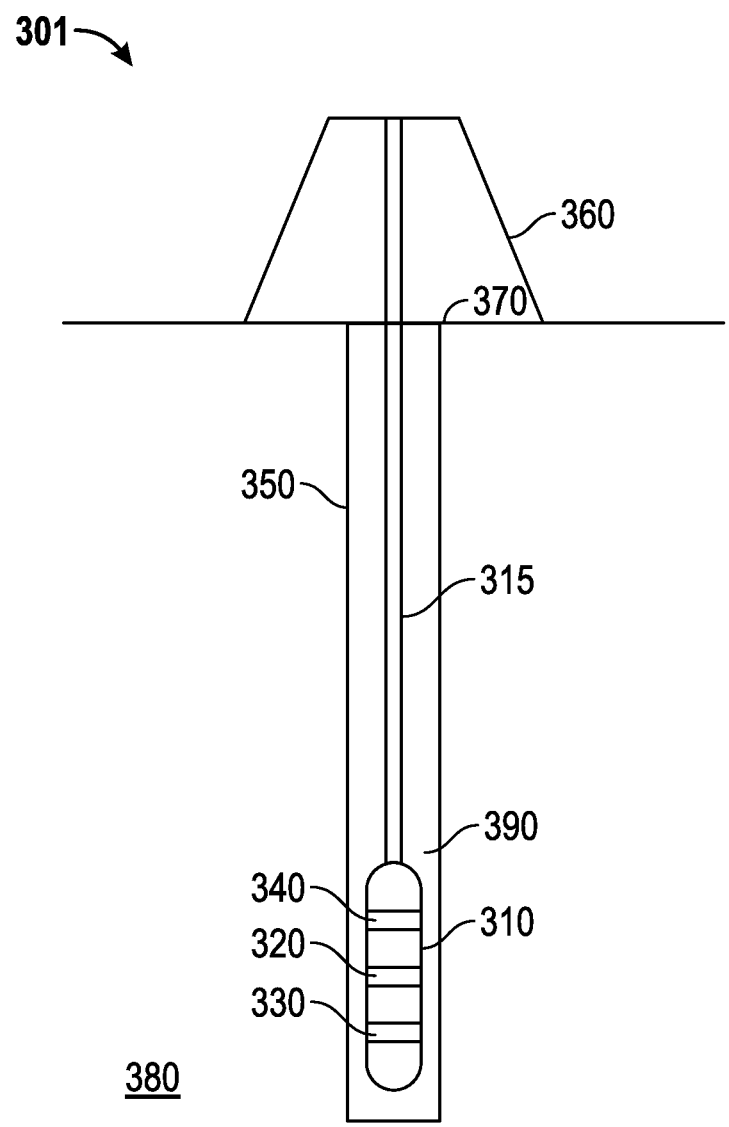
FIG. 3 schematically illustrates a drilling system having a downhole tool configured to acquire information for estimating a parameter of interest of a formation.

As discussed above, radiation detectors disclosed herein may be especially beneficial when used in LWD applications. An example drilling system for use in conjunction with LWD is illustrated herein. FIG. 3 schematically illustrates a drilling system 301 having a downhole tool 310 configured to acquire information for estimating porosity or another parameter of interest of a formation 380. In one illustrative embodiment, the tool 310 may contain a radiation source 340 and associated sensors for detection, or detectors 320, 330. Sensors 320 may detect one or more parameters of a formation. Parameters of a formation may include information relating to a geological parameter, a geophysical parameter, a petrophysical parameter, and/or a lithological parameter. Thus, the sensors 320 may include sensors for estimating formation resistivity, dielectric constant, the presence or absence of hydrocarbons, acoustic porosity, bed boundary, formation density, nuclear porosity and certain rock characteristics, permeability, capillary pressure, and relative permeability.

The system 301 may include a conventional derrick 360 erected on a derrick floor 370. A conveyance device (carrier 315) which may be rigid or non-rigid, may be configured to convey the downhole tool 310 into wellbore 350 in proximity to formation 380. The carrier 315 may be a drill string, coiled tubing, a slickline, an e-line, a wireline, etc. Downhole tool 310 may be coupled or combined with additional tools (e.g., some or all the information processing system of FIG. 3). Thus, depending on the configuration, the tool 310 may be used during drilling and/or after the wellbore 350 has been formed. While a land system is shown, the teachings of the present disclosure may also be utilized in offshore or subsea applications. The carrier 315 may include embedded conductors for power and/or data for providing signal and/or power communication between the surface and downhole equipment. The carrier 315 may include a bottom hole assembly, which may include a drilling motor for rotating a drill bit.

The radiation source 340 emits radiation (e.g., neutrons) into the formation to be surveyed. In one embodiment, the downhole tool 310 may use a pulsed neutron generator emitting 14.2 MeV fast neutrons as its radiation source 340. The use of 14.2 MeV neutrons from a pulsed neutron source is illustrative and exemplary only, as different energy levels of neutrons may be used. In some embodiments, the radiation source 340 may be continuous. In some embodiments, the radiation source 340 may be controllable in that the radiation source may be turned "on" and "off" while in the wellbore, as opposed to a radiation source that is "on" continuously. The measurements performed using this type of radiation may be referred to as "sourceless" measurements since they employ a source that may be turned off, as opposed to a continuously emitting chemical radiation source.

The detectors 320, 330 provide signals that may be used to estimate the radiation counts (e.g., neutron counts) returning from the formation. Generally, detectors 320, 330 are spaced in a substantially linear fashion relative to the radiation source. If two detectors are used, there may be a short spaced (SS) detector and a long spaced (LS) detector, wherein the detectors have different distances from the radiation source. For instance, in one embodiment, detector 330 may be a short spaced detector, and detector 320 may be a long spaced detector. The SS and LS detectors are not limited to being placed on the same side of the radiation source and their spacing from the radiation source may be equal or unequal. Additional detectors may be used to provide additional radiation information. Two or more of the detectors may be neutron detectors. Drilling fluid 390 may be present between the formation 380 and the downhole tool 310, such that emissions from radiation source 340 may pass through drilling fluid 390 to reach formation 380 and radiation induced in the formation 380 may pass through drilling fluid 390 to reach the detectors 320, 330.

In one embodiment, electronics (not shown) associated with the detectors may be configured to record radiation counts from at least two axially spaced detectors 320, 330 and generate a time-dependent ratio between axially spaced detectors by using information from multiple bursts. This detection may occur within very narrow time bins or windows (on the order of 1 to 1000 microseconds). This ratio may be expressed as a curve or other graphical function that describes a combination of multiple ratio values. In some embodiments, the parameter of interest may be estimated using a difference between the detector counts. Herein, the term time-dependent broadly describes the property of the ratio to vary with time, as opposed to a ratio that remains constant, such as may occur with a continuous radiation source. In some embodiments, the time-dependent ratio may be weighted. The axially spaced detector count rate ratios may be obtained as a function of time and graphically illustrated as a time-dependent ratio curve. Various properties of the formation may be determined using the time-dependent ratio curve, including, but not limited to, porosities of the formation.

In other embodiments, such electronics may be located elsewhere (e.g., at the surface). To perform the treatments during a single trip, the tool may use a "high bandwidth" transmission to transmit the information acquired by detectors 320, 330 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time."

One or more of the neutron detectors 320, 330 may include a neutron sensitive scintillation media (or scintillation element), optically coupled to an optical light guide, and at least one photodetector (e.g., a photomultiplier tube, charge coupled silicon device, or other photomultiplier device or light responsive device, or the like) configured to produce an output representative of the respective light scintillations. The scintillation media is a radiation responsive element which produces light scintillations in response to absorbing neutrons. In one class of radiation responsive materials, these emissions are photons produced by scintillation. In scintillation, light is emitted as a result of the absorption of radiation, such as, for example, a neutron. The scintillation media and/or light guides may include glass, glass ceramics, plastic, organic or inorganic crystal, or ceramics, composites, or any other suitable material. The scintillation media and/or light guides may include glass or other material doped with isotopes of one or more of boron (B-10), lithium (e.g., Li-6, Li-7), cerium, europium, praseodymium, and terbium.

Figure 4A:
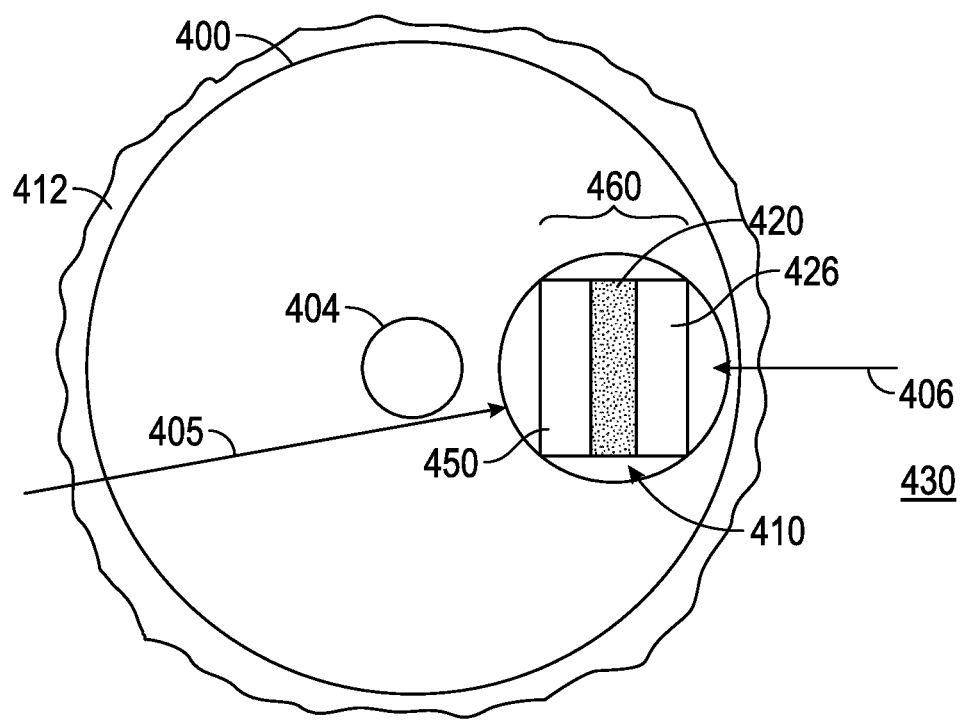

FIGS. 4A and 4B illustrate a tool including a detector in accordance with embodiments of the invention. Tool 400 is configured to be conveyed in borehole 412 intersecting formation 430. Tool 400 is a drilling tool and includes mud channel 404 for circulating drilling mud, as described above.

Tool 400 includes neutron detector 410. Neutron detector 410 includes neutron sensitive scintillation media 420 optically coupled to optically transparent neutron absorptive material light guide 450. Neutron sensitive scintillation media 420 is further optically coupled to light guide 426. Neutron sensitive scintillation media 420, light guide 426, and optically transparent neutron absorptive material light guide 450 are optically coupled to photodetector 470 such that light scintillations occurring in the scintillation media 420 are converted to electrical signals. The neutron detector 410 is protected from neutrons 405 arriving from unwanted directions by optically transparent neutron absorptive material light guide 450. Neutrons 406 from the formation 430 are still detected by neutron detector 410. Because additional shielding is unnecessary, the entirety of the detector chamber cross section is available for the active elements 460. Optically transparent neutron absorptive material light guide 450 is rectangular in shape, which may increase detection from the formation and provide for ease of manufacture.

FIG. 4C illustrates a tool including a detector in accordance with embodiments of the invention. Tool 402 includes a detector 480 having a similar cross section and components to those of detector 410. The neutron sensitive volume of detector 480, however, comprises a plurality of scintillation elements 422-428, which may comprise the same scintillation media 420 or different scintillation media. Employing the array of scintillation elements 422-428 provides for improved detection and ease of manufacturing. Additionally, the response of the scintillation media is more consistent with changes in temperature and pressure when employing the plurality of elements.

Although depicted as plates, in various implementations neutron sensitive scintillation media and light guides may have a cylindrical, square or polyhedron cross-section shape. Either neutron detector 320, 330 may be any tubular or hemispherical shape, having, for example, a generally ovular, rectangular, or irregular cross-section. In further embodiments, one or more of the elements may comprise an aggregate of a plurality of rods, sheets, beads, or other shapes comprised of one or more radiation responsive materials, and so on. The elements may be flat, or curved along one or more axes on one or more surfaces, or may be irregular.

Although external light-reflecting wrapping is not depicted in the referenced figures, light reflective wrapping, treatments, or other intensity preservation or amplification measures may be used in conjunction with detectors in accordance with the present disclosure, as known in the art.

Figure 6:
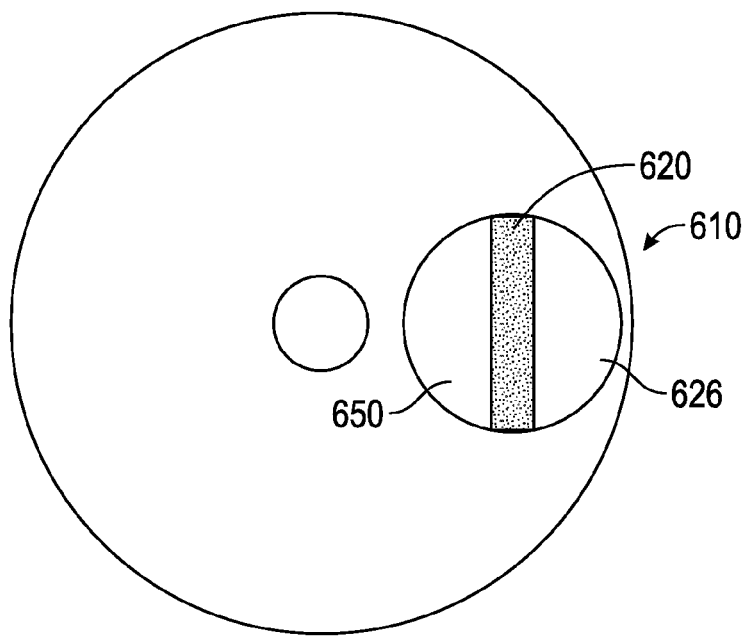
FIGS. 6-8 illustrate a tool including other detectors in accordance with embodiments of the invention.

FIG. 6 illustrates a tool including another detector in accordance with embodiments of the invention. FIG. 6 illustrates a detector 610 including rounded light guide 626 and optically transparent neutron absorptive material light guide 650 increasing detector sensitive area 620.

Figure 7:
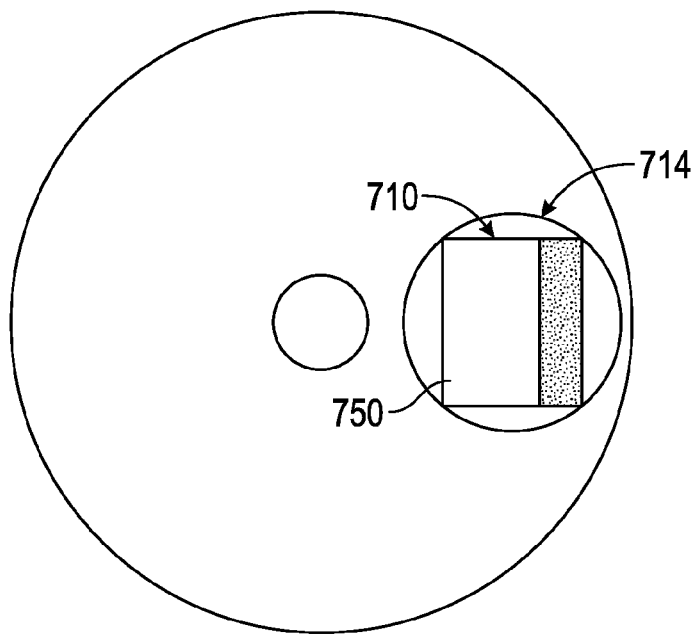

FIG. 7 illustrates a tool including another detector in accordance with embodiments of the invention. FIG. 7 illustrates a detector 710 without a conventional light guide. Detector 710 includes optically transparent neutron absorptive material light guide 750 which occupies the majority of the cross section of detector chamber 714.

Figure 8:
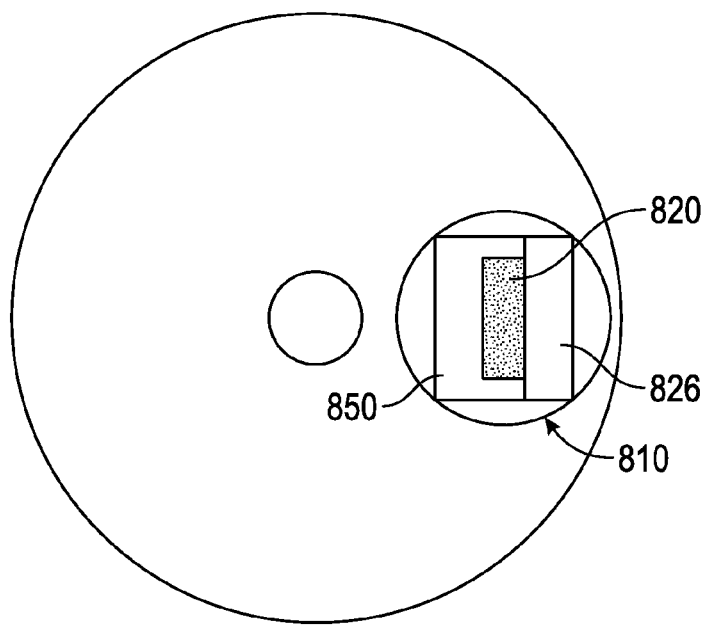

FIG. 8 illustrates a tool including another detector in accordance with embodiments of the invention. FIG. 8 illustrates a detector 810 with light guide 826 and neutron-absorbing light guides 850 covering a large solid angle.

In other aspects the optically transparent neutron absorptive material may be employed as an epithermal neutron detector in a downhole tool. The components of the detector may be constructed of similar materials as in the directional detector embodiments above. For example, the thermal neutron-absorbing light guide may be constructed with glass, glass ceramics, plastic, organic or inorganic crystal or ceramics doped with an isotope. However, specific material choices, dimensions, combinations of isotopes, and enrichments may be particularly chosen and suited for the epithermal neutron detector. Each of these may be the same as or different than the embodiments above.

Figure 9A:
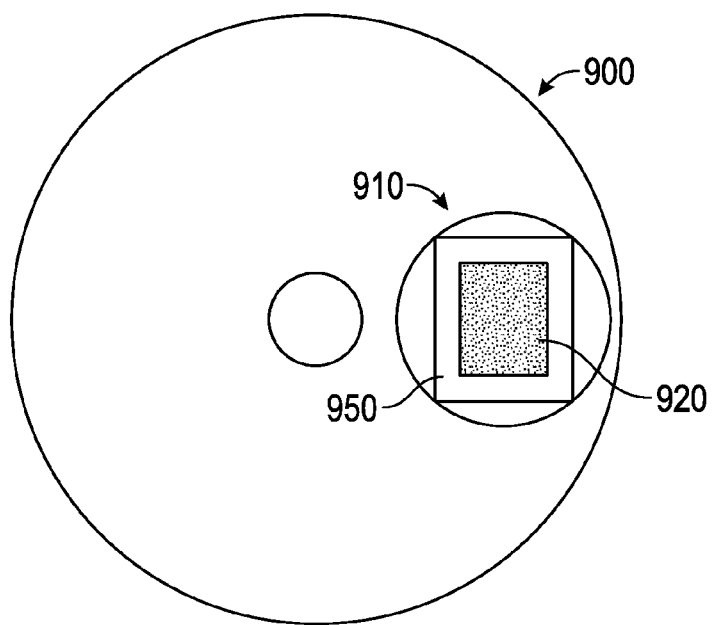
FIGS. 9A and 9B illustrate a tool including an epithermal neutron detector in accordance with embodiments of the invention.
Figure 9B:
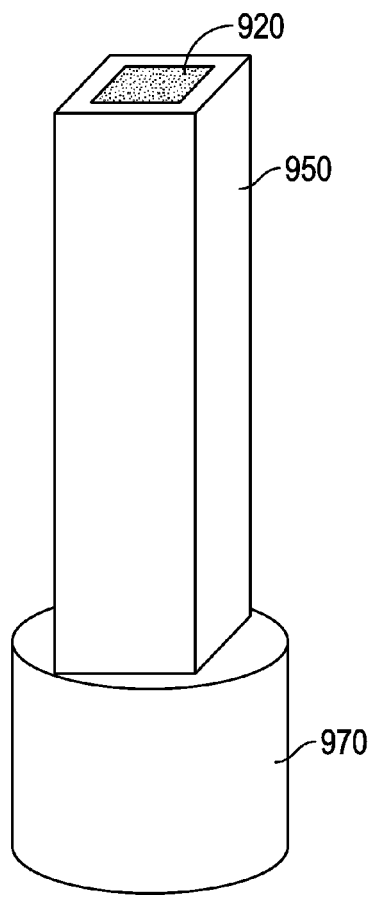

FIGS. 9A and 9B illustrate a tool including an epithermal neutron detector in accordance with embodiments of the invention. Tool 900 includes a detector 910 comprising a neutron sensitive scintillation media 920 disposed within an optically transparent neutron absorptive material 950 coupled to photodetector 970. The optically transparent neutron absorptive material 950 is configured to prevent substantially all incident neutrons having an incident neutron energy below a selected energy threshold from reaching the media. Configuration of the optically transparent neutron absorptive material 950 may take into account the material composition and dimensions. The selected energy threshold may be approximately 0.2 eV, which corresponds to the division between thermal and fast neutrons. In such a case, optically transparent neutron absorptive material 950 is adapted to capture thermal neutrons with high efficiency. For example, the optically transparent neutron absorptive material 950 may be configured to absorb or otherwise capture substantially all the thermal neutrons incident on the detector, such that any thermal neutrons traversing the optically transparent neutron absorptive material 950 do not spoil the epithermal count.

Detector 910 reduces or eliminates the need for thermal neutron absorption screens in the downhole tool.

Figure 10:
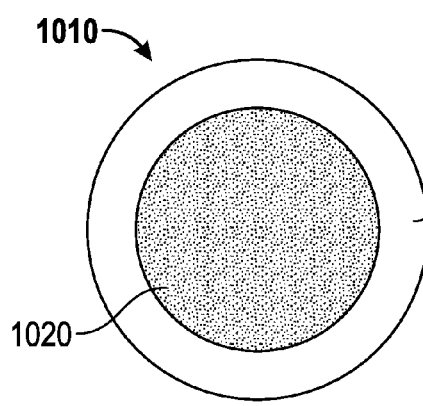
FIGS. 10-13A-B illustrate other tools including other epithermal neutron detectors in accordance with embodiments of the invention.

FIG. 10 illustrates another epithermal detector in accordance with embodiments of the invention. FIG. 10 illustrates a detector 1010 with cylindrical neutron-absorbing light guide 1050 surrounding the neutron sensitive media 1020.

Figure 11:
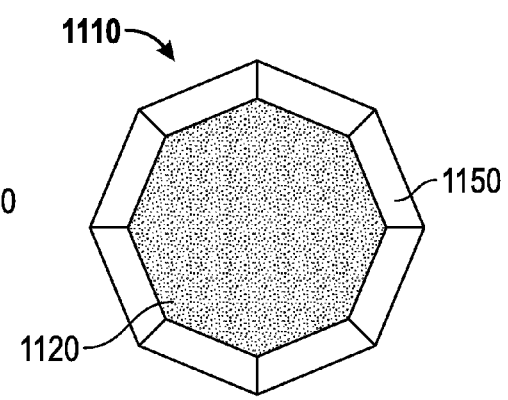

FIG. 11 illustrates an octahedral epithermal detector in accordance with embodiments of the invention. FIG. 11 illustrates a detector 1110 with an array of neutron-absorbing light guides 1150 surrounding the neutron sensitive media 1120. Array of neutron-absorbing light guides 1150 may provide greater ease of manufacture than cylindrical neutron-absorbing light guide 1050. However, cylindrical neutron-absorbing light guide 1050 may provide greater detection sensitivity.

Figure 12:
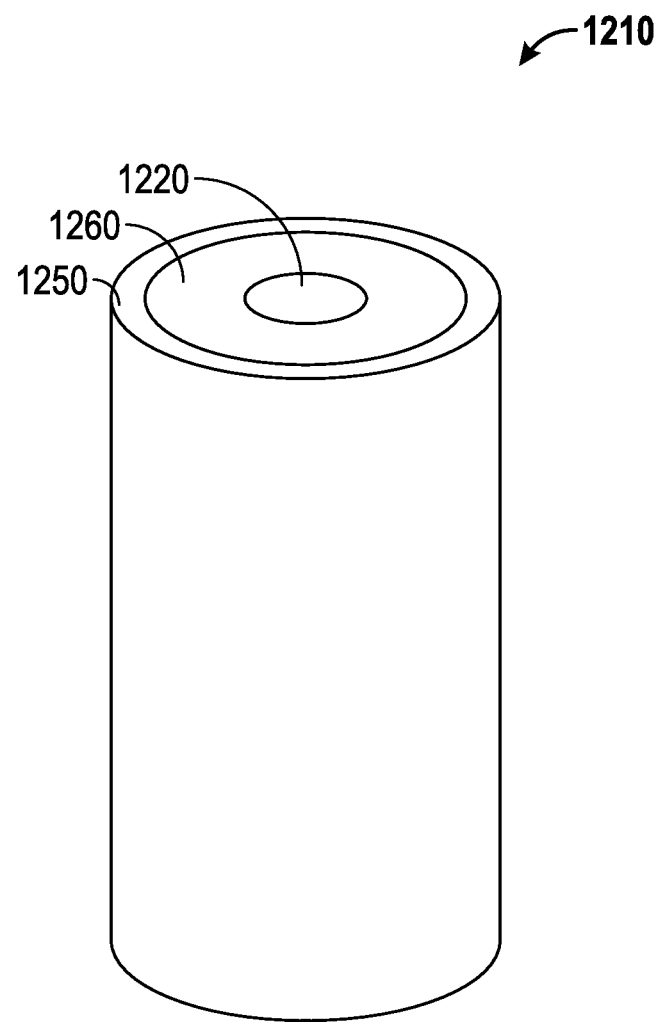

FIG. 12 illustrates another epithermal detector in accordance with embodiments of the invention. FIG. 12 illustrates a detector 1210 with cylindrical neutron-absorbing light guide 1250 surrounding neutron reflector 1260, which surrounds neutron sensitive media 1220. Neutron reflector 1260 comprises a neutron-moderating material in which the scintillation media is disposed. The neutron-moderating material is made of substances with high scattering cross-section of epithermal neutrons to moderate epithermal neutrons. The neutron-reflecting material may comprise an optically transparent light guide optically coupled to the neutron sensitive scintillation media, which further improves light collection in the detector. Detector 1210 reduces or eliminates the need for conventional neutron moderators in the down-hole tool.

Figure 13A:
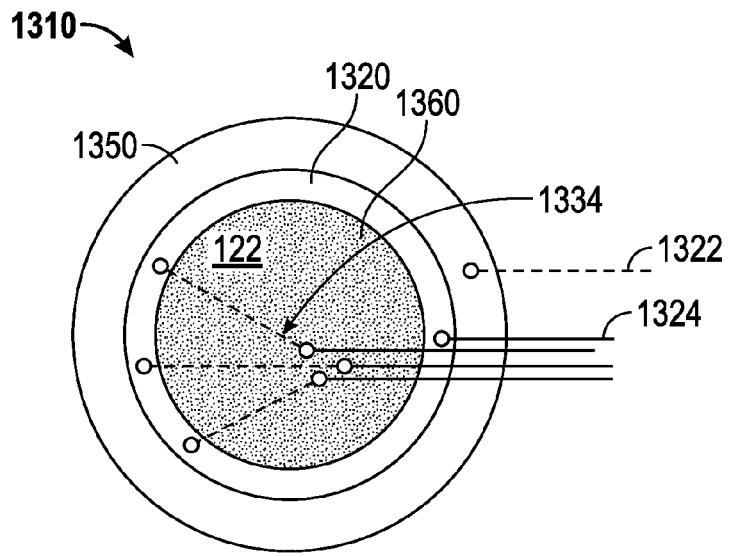
Figure 13B:
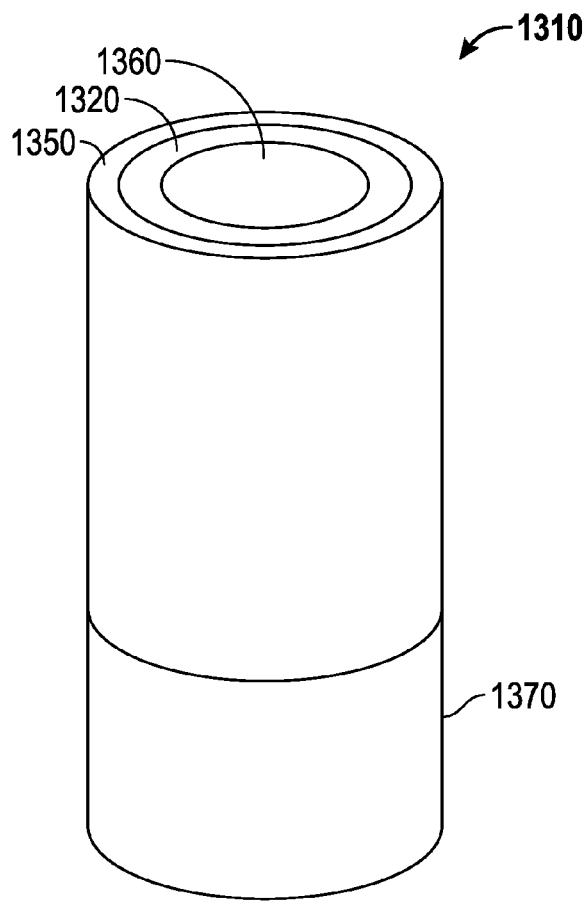

FIGS. 13A-B illustrate another epithermal detector in accordance with embodiments of the invention. FIGS. 13A-B illustrate a detector 1310 with cylindrical neutron-absorbing light guide 1350 surrounding neutron sensitive media 1320, which surrounds neutron moderator 1360. The neutron-reflecting material may again comprise a light guide. In operation, both thermal neutrons 1322 and epithermal neutrons 1324 are incident on neutron-absorbing light guide 1350. Substantially all thermal neutrons 1322 are absorbed, while a significant portion of epithermal neutrons 1324 traverse neutron-absorbing light guide 1350, where they may be detected by neutron sensitive media 1320 coupled to photodetector 1370. Of those neutrons that traverse neutron sensitive media 1320, a significant portion are moderated to thermal neutrons 1334 by neutron moderator 1360. Thermal neutrons 1334 are then detected in neutron sensitive media 1320.

The neutron-reflecting material may comprise beryllium, carbon, hydrogen or deuterium containing substances. For example, the neutron-reflecting light guide may include beryllium, carbon, hydrogen or deuterium containing and optically transparent substances such as beryllium ceramics or carbon, hydrogen or deuterium containing plastics and resins. Any other neutron-moderating glass, glass ceramics, plastic, organic crystal, inorganic crystal or ceramics or combinations of these may be used.

Returning to FIG. 3, processing may be carried out on the output from detectors 320, 330 to determine the luminescent activity, and thus the number of neutrons incident, on each of the detectors. Variations in patterns may be used for analysis to determine what types of radiation are being detected, such as gamma rays, neutrons having different energy levels, and the like.

In other specific embodiments, the tool 310 may be a wireline tool having a neutron detector as above configured to fit the tool. The tool 310 may be adapted for a borehole having specific diameters.

Figure 14:
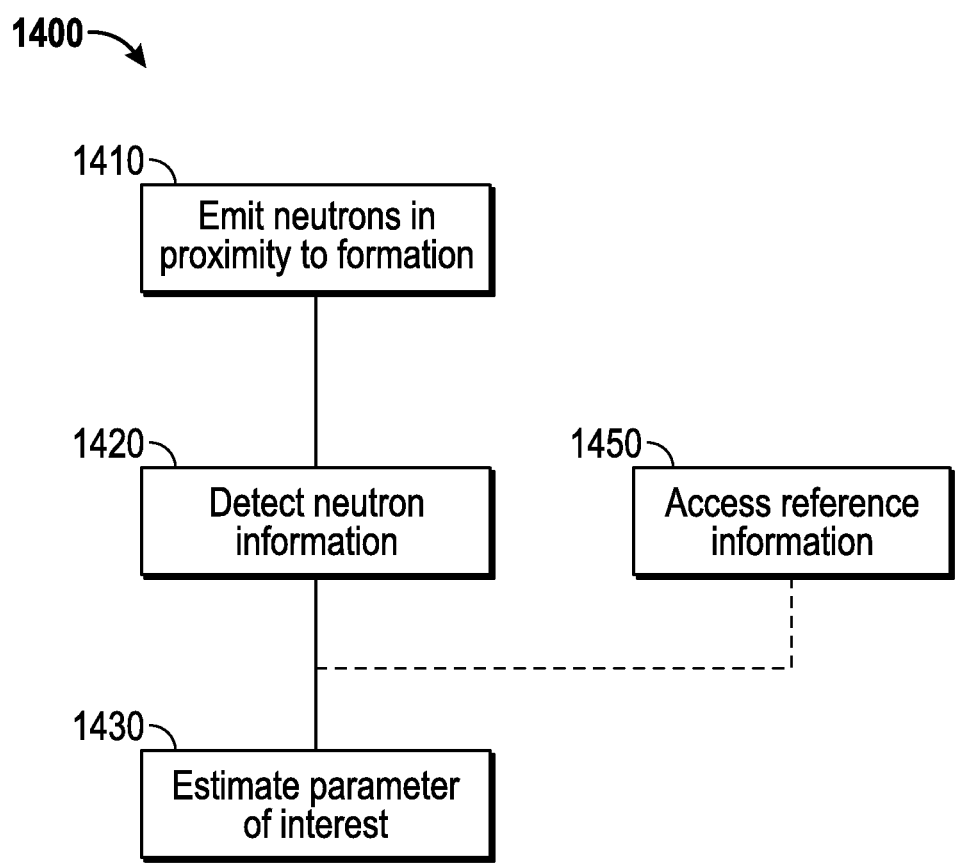
FIG. 14 shows, in flow chart form, one method according to the present disclosure for estimating at least one parameter of interest of the formation using a model relating neutron count information acquired from at least neutron detector to the parameter of interest.

FIG. 14 shows, in flow chart form, one method 1400 according to the present disclosure for estimating at least one parameter of interest of the formation 380 (FIG. 3) using a model relating neutron count information acquired from at least neutron detector 320, 330 to the parameter of interest. Referring now to FIGS. 3 and 14, method 1400 may include step 1410, where the radiation source 340 emits neutrons in proximity to the formation 380. In step 1420, information on neutrons may be collected by one or more of detectors 320, 330, where at least one of the one or more detectors 320, 330 is a neutron detector in accordance with embodiments of the present disclosure collecting neutron count information. In step 1430, a parameter of interest (e.g., porosity) of the formation 380 may be estimated by applying one or more count rates from one or both of the detectors to the model. Information collected by the detector(s) may be used to generate a difference between or a ratio of the neutron counts attributable to the detectors. The estimation of the parameter of interest may also include comparison or combination of the neutron count information with reference information about the formation. In some embodiments, estimation methods 1400 may include step 1450, where reference information on the formation or formations generally is accessed. Reference information may be combined with neutron count information in step 1430 to estimate the parameter of interest.

Although aspects of the present disclosure may reduce or eliminate the need for shielding, some embodiments may include additional shielding. Shielding of the detectors may be implemented for neutrons and gamma rays. Gamma ray shielding prevents the detection of gamma rays from behind the tool and from that originating within the tool. Neutron shielding prevents neutrons from reaching the detector regions and inducing gamma rays. Combinations of neutron moderators, neutron absorbers, high hydrogen content epoxies, and high-density high-Z materials are known to those skilled in the art.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions.

By "substantially all," it is meant a portion of thermal neutrons and/or epithermal neutrons sufficiently high to allow use of thermal and epithermal counts from detectors and derivations and comparisons thereof (differences, ratios, rates of change, and so on) to determine a parameter of interest of the formation, examples of such a portion including, for example, at least 90 percent, at least 95 percent, at least 99 percent, at least 99.9 percent, and so on, up to an including all incident thermal and/or epithermal neutrons. Materials providing such absorption may have a neutron attenuation coefficient of at least 2.0, 2.5, 3.0, 3.5 cm$^{-1}$ or higher for thermal neutrons. One example material may have a neutron attenuation coefficient of 2.71.

In physical optics, transmission of a media is evaluated through attenuation coefficient k (dimension cm$^{-1}$), which establishes dependence between light intensity in the input of the media Io, light intensity in the output of the media I, and length of light pass in the media l.

$$T=I/Io=10-kl$$

or expressed in base e instead of base 10:

$$T=I/Io=e-kl$$

Besides transmission T, concepts of attenuation length L is also often used in optics:

$$L=1/k,$$

wherein attenuation length is the length of light pass in the media, after which light intensity is reduced by a factor of 2.7 (although a factor of 10 may instead be used in some contexts).

Since transmission of a media is wavelength dependent, for a scintillation material itself and for corresponding materials such as light guides, high transmission is mostly important in the wavelength region of scintillations to guarantee that as many scintillation photons as possible will reach a photodetector. Therefore, attenuation coefficient k of a scintillation material is often provided for the wavelength of maximum of scintillation emission spectrum.

As used herein, an optically transparent media may be a media with high optical transmission, or with low attenuation. In scintillation techniques, optical transparency of scintillators and corresponding optical materials may vary significantly. For example, attenuation length (at the emission maximum, base e) of yttrium aluminum perovskite YAlO3:Ce may be as low as 5-10 cm, for sodium iodide NaI(Tl) it may reach 100 cm, and be even more for high quality optical glass.

Optical transparency of scintillators may be defined in terms of the portion of scintillation photons reaching the photodetector. In applications which require high energy resolution, accuracy may greatly depend on the number of photons reaching the photodetector. In such circumstances, scintillators with low attenuation length such as yttrium aluminum perovskite may be used in the shape of thin plates or discs placed on photodetector to shorten the length of the scintillation light path within the scintillator material as much as possible.

For detectors of the present disclosure, additional factors may reduce the number of scintillation photons arriving at the photodetector. First, a drop of scintillation light yield (30-50 percent or more from the initial value at room temperature) may occur at high operational temperatures due to physical processes inside the scintillation material. It may thus be desirable to minimize light loss from other sources. Commensurately, "optically transparent" media in the context of the present disclosure means media with loss of scintillation photons of no more than ten percent. For optical glass, typical transmittance at 420-430 nm (scintillation emission maximum of scintillation glass ceramics) may be as large as 97 percent for 10 cm light pass.

As used herein, "optically coupled" may be defined as joined in a way providing beneficial conditions for light propagating in a first media to enter a second media. For example, if the joined media have refractive indexes n1 and n2 respectively, and n1>n2, beneficial conditions exist when the gap is filled with optical grease, adhesive, or the like with refractive index n3 such that n1>n3>n2.

As used herein, "neutron absorptive material" may be defined as any material capable of substantial neutron absorption. Substantial neutron absorption may be defined as sufficient neutron absorption for practical shielding use in an LWD application. Substantial neutron absorption may be defined as a material, which when in dimensions suitable for use in a light guide for a downhole radiation detector in a borehole intersecting an earth formation absorbs at least 10 percent, at least 25 percent, at least 50 percent, at least 75 percent, at least 90 percent, at least 95 percent, at least 97 percent, at least 98 percent, at least 99 percent, at least 99.9 percent, and so on, up to an including all incident thermal and/or epithermal neutrons. E-times attenuation (2.71 times, 63% attenuation, 37% transmission) is significant and may also be used.

Such material may include isotopes having a neutron cross section of at least 900 b for neutrons with energy 0.025 eV, although in some contexts it may have a neutron cross section of 4000 b. Any materials incorporating various amounts of natural or enriched isotopes sufficient to perform as above while remaining sufficiently transparent may be used. For example, boron glass containing from around 10-20% of natural boron (approximately 20 percent B-10 and 80 percent B-11) or more sufficiently absorbs thermal neutrons and is a neutron absorptive material.

Neutron transmission can be described as ratio of neutron flux in the output F and input Fo of the media with thickness l.

$$T=F/Fo=e-kl,$$

where k is the attenuation coefficient of neutrons in the specific media. Thus, neutron transmission is a fraction of flux on media exit. Neutron absorption A is a fraction of flux rested in the media:

$$A=1-F/Fo,$$

$$A+T=1$$

Neutron transmission and neutron absorption can also be expressed as a percentage.

$$A+T=100\%$$

Cross section σ of neutron absorption is a probability value, namely probability of neutron interaction with a target nucleus. It has a linear relation with attenuation coefficient through the nuclei density inside the target.

Cross section σ is expressed in barns, with 1 b equal to 10$^{-28}$ m$^2$.

For neutrons with energy 0.025 eV, cross section of reaction on 7Li σ=945 b; for reaction on 10B σ=4010 b; for reaction on 3He σ=5400 b.

"Radiation responsive" is defined as the characteristic of producing a detectable emission in response to absorbing radiation such that the absorbed radiation is quantifiable according to the emissions.

As used above, the term "absorb" refers to absorption in the sense of converting ionizing radiation to other detectable indicia, such as, for example, photons. As used above, the term "incident" or "incident on" refers to impinging on the physical space of or penetrating the defining boundaries of (e.g., entering a media). As used above, the term "traverse" means to pass through without notable reaction.

Certain embodiments of the present disclosure may be implemented with a hardware environment that includes an information processor, an information storage medium, an input device, processor memory, and may include peripheral information storage medium. The hardware environment may be in the well, at the rig, or at a remote location. Moreover, the several components of the hardware environment may be distributed among those locations. The input device may be any data reader or user input device, such as data card reader, keyboard, USB port, etc. The information storage medium stores information provided by the detectors. Information storage medium may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium stores a program that when executed causes information processor to execute the disclosed method. Information storage medium may also store the formation information provided by the user, or the formation information may be stored in a peripheral information storage medium, which may be any standard computer information storage device, such as a USB drive, memory stick, hard disk, removable RAM, or other commonly used memory storage system known to one of ordinary skill in the art including Internet based storage. Information processor may be any form of computer or mathematical processing hardware, including Internet based hardware. When the program is loaded from information storage medium into processor memory (e.g. computer RAM), the program, when executed, causes information processor to retrieve detector information from either information storage medium or peripheral information storage medium and process the information to estimate a parameter of interest. Information processor may be located on the surface or downhole.

The present disclosure is susceptible to embodiments of different forms. While the present disclosure is discussed in the context of a hydrocarbon producing well, it should be understood that the present disclosure may be used in any borehole environment (e.g., a geothermal well). There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. A formation evaluation tool for detecting radiation in a borehole in a volume of an earth formation, comprising:
   a neutron sensitive scintillation media;
   at least one photodetector optically coupled to the neutron sensitive media at a coupled surface of the media; and
   at least one optically transparent neutron absorptive material optically coupled to at least one other surface of the media not coupled to the at least one photodetector.

2. The tool of claim 1 wherein the at least one optically transparent neutron absorptive material is positioned to prevent incident neutrons from reaching a neutron-shaded surface of the media.

3. The tool of claim 2 wherein the at least one optically transparent neutron absorptive material is positioned to provide directional sensitivity by allowing a lower proportion of neutrons to reach the media through the neutron-shaded surface than through the remaining surfaces.

4. The tool of claim 1 wherein the neutron sensitive scintillation media is disposed within the at least one optically transparent neutron absorptive material, and the at least one optically transparent neutron absorptive material is configured to prevent substantially all incident neutrons having an incident neutron energy below a selected energy threshold from reaching the media.

5. The tool of claim 4 wherein the selected energy threshold is approximately 0.2 eV.

6. The tool of claim 4 further comprising a neutron-moderating material disposed within the scintillation media.

7. The tool of claim 6 wherein the neutron-moderating material comprises an optically transparent light guide optically coupled to the neutron sensitive scintillation media.

8. The tool of claim 7 wherein the neutron-moderating material comprises at least one material selected from: i) a beryllium-based ceramic, ii) a carbon-based plastic, iii) a hydrogen-based plastic, iv) a deuterium-based plastic, v) a carbon-based resin, vi) a hydrogen-based resin, and vii) a deuterium-based resin.

9. The tool of claim 1 wherein the at least one optically transparent neutron absorptive material includes at least one of i) Li-6 and ii) B-10.

10. The tool of claim 1 wherein the optically transparent neutron absorptive material comprises at least one light guide.

11. The tool of claim 10 wherein the light guide absorbs at least 10 percent of incident thermal neutrons.

12. The tool of claim 1 wherein the at least one optically transparent neutron absorptive material has a lower index of refraction than the media.

13. The tool of claim 1 wherein the at least one optically transparent neutron absorptive material absorbs less than 5 percent of scintillation photons emitted by the media.

14. The tool of claim 1 wherein the at least one optically transparent neutron absorptive material comprises at least one material selected from: i) glass, ii) glass ceramics, iii) plastic, iv) organic crystal, v) inorganic crystal, and vi) ceramic material.

15. The tool of claim 1 wherein the at least one optically transparent neutron absorptive material includes atoms of at least one chemical element having a thermal neutron capture cross section higher than a corresponding fast neutron capture cross section.

16. The tool of claim 1 further comprising:
    a drill string;
    a radiation source positioned on the drill string; and
    a radiation detector positioned on the drill string wherein the active elements are associated with the radiation detector.

17. A method for detecting radiation in a borehole in a volume of an earth formation, comprising:
    using a neutron sensitive scintillation media to produce light scintillations indicative of neutrons absorbed by the media; and
    transmitting at least a portion of the light scintillations to at least one photodetector optically coupled to the neutron sensitive media at a coupled surface of the media through at least one optically transparent neutron absorptive material optically coupled to at least one other surface of the media not coupled to the at least one photodetector.

18. The method of claim 17 further comprising positioning the at least one optically transparent neutron absorptive material to prevent incident neutrons from reaching a neutron-shaded surface of the media.

19. The method of claim 17 wherein the neutron sensitive scintillation media is disposed within the at least one optically transparent neutron absorptive material, the method further comprising selecting dimensions of the at least one optically transparent neutron absorptive material such that substantially all incident neutrons having an incident neutron energy below a selected energy threshold are prevented from reaching the media.

20. A formation evaluation tool for detecting radiation in a borehole in a volume of an earth formation, comprising:
 active elements including:
  at least one neutron sensitive scintillation media comprising a light guide; and
  at least one optically transparent neutron absorptive material optically coupled to the media;
 and at least one photodetector optically coupled to the at least one neutron sensitive media at a first end of the neutron sensitive media;
 wherein the light guide extends to a second end of the neutron sensitive media opposite the first end.

* * * * *